(12) United States Patent
Horn

(10) Patent No.: US 11,747,473 B2
(45) Date of Patent: Sep. 5, 2023

(54) APPARATUS AND METHOD FOR ASCERTAINING A DISTANCE TO AN OBJECT

(71) Applicant: Carl Zeiss AG, Oberkochen (DE)

(72) Inventor: Jan Horn, Munich (DE)

(73) Assignee: CARL ZEISS AG, Oberkochen (DE)

( * ) Notice: Subject to any disclaimer, the term of this patent is extended or adjusted under 35 U.S.C. 154(b) by 515 days.

(21) Appl. No.: 16/937,987

(22) Filed: Jul. 24, 2020

(65) Prior Publication Data

US 2021/0026014 A1 Jan. 28, 2021

(30) Foreign Application Priority Data

Jul. 24, 2019 (DE) .......................... 102019210999.3

(51) Int. Cl.
*G01S 17/00* (2020.01)
*G01S 17/34* (2020.01)
*G01S 7/4913* (2020.01)

(52) U.S. Cl.
CPC ............ *G01S 17/34* (2020.01); *G01S 7/4913* (2013.01)

(58) Field of Classification Search
USPC .............................................. 356/4.01, 5.01
See application file for complete search history.

(56) References Cited

U.S. PATENT DOCUMENTS

| | | | |
|---|---|---|---|
| 6,278,398 B1* | 8/2001 | Vossiek | G01S 7/4017 342/134 |
| 10,323,924 B2* | 6/2019 | Wan | G01B 11/14 |
| 10,598,764 B2* | 3/2020 | Josefsberg | H03L 7/091 |
| 2004/0196037 A1* | 10/2004 | Xiang | G01R 33/60 324/300 |
| 2006/0104596 A1* | 5/2006 | Askins | G02B 26/0825 385/147 |
| 2006/0219875 A1 | 10/2006 | Yamada | |
| 2017/0003372 A1 | 1/2017 | Antoina et al. | |
| 2017/0090031 A1 | 3/2017 | Bondy et al. | |
| 2018/0024246 A1 | 1/2018 | Jeong et al. | |
| 2018/0238675 A1* | 8/2018 | Wan | G01B 9/02002 |
| 2018/0321143 A1* | 11/2018 | Ideguchi | G02B 26/10 |
| 2019/0025426 A1 | 1/2019 | Satyan et al. | |
| 2019/0128998 A1* | 5/2019 | Josefsberg | G01S 13/867 |
| 2019/0154439 A1* | 5/2019 | Binder | G01B 11/26 |

OTHER PUBLICATIONS

Carl Zeiss AG, DE102019210999.3, First Office Action, dated Feb. 12, 2020, 21 pgs.

(Continued)

*Primary Examiner* — James R Hulka
(74) *Attorney, Agent, or Firm* — Morgan, Lewis & Bockius LLP

(57) ABSTRACT

An apparatus for ascertaining a distance to an object has a light source unit for emitting an optical signal with a time-varying frequency, an evaluation device for ascertaining a distance to the object based on (a) a measurement signal that arose from the signal and was reflected at the object and (b) a reference signal that was not reflected at the object. The apparatus has also a dispersive element disposed in the signal path of the optical signal and an optical position sensor disposed downstream of this dispersive element in the signal path.

23 Claims, 8 Drawing Sheets

(56) References Cited

OTHER PUBLICATIONS

Carl Zeiss AG, DE102019210999.3, Second Office Action, dated Feb. 6, 2023, 16 pgs.
Van Acoleyen, Karel, Wim Bogaerts, and Roel Baets. "Two-dimensional dispersive off-chip beam scanner fabricated on silicon-on-insulator." IEEE photonics technology letters 23.17 (2011): 1270-1272, vol. 23, No. 17, Sep. 1, 2011, 3 pgs.
Satyan, Naresh, et al. "Precise control of broadband frequency chirps using optoelectronic feedback," Optics express 17.18 (2009): 15991-15999., 9 pgs.

\* cited by examiner

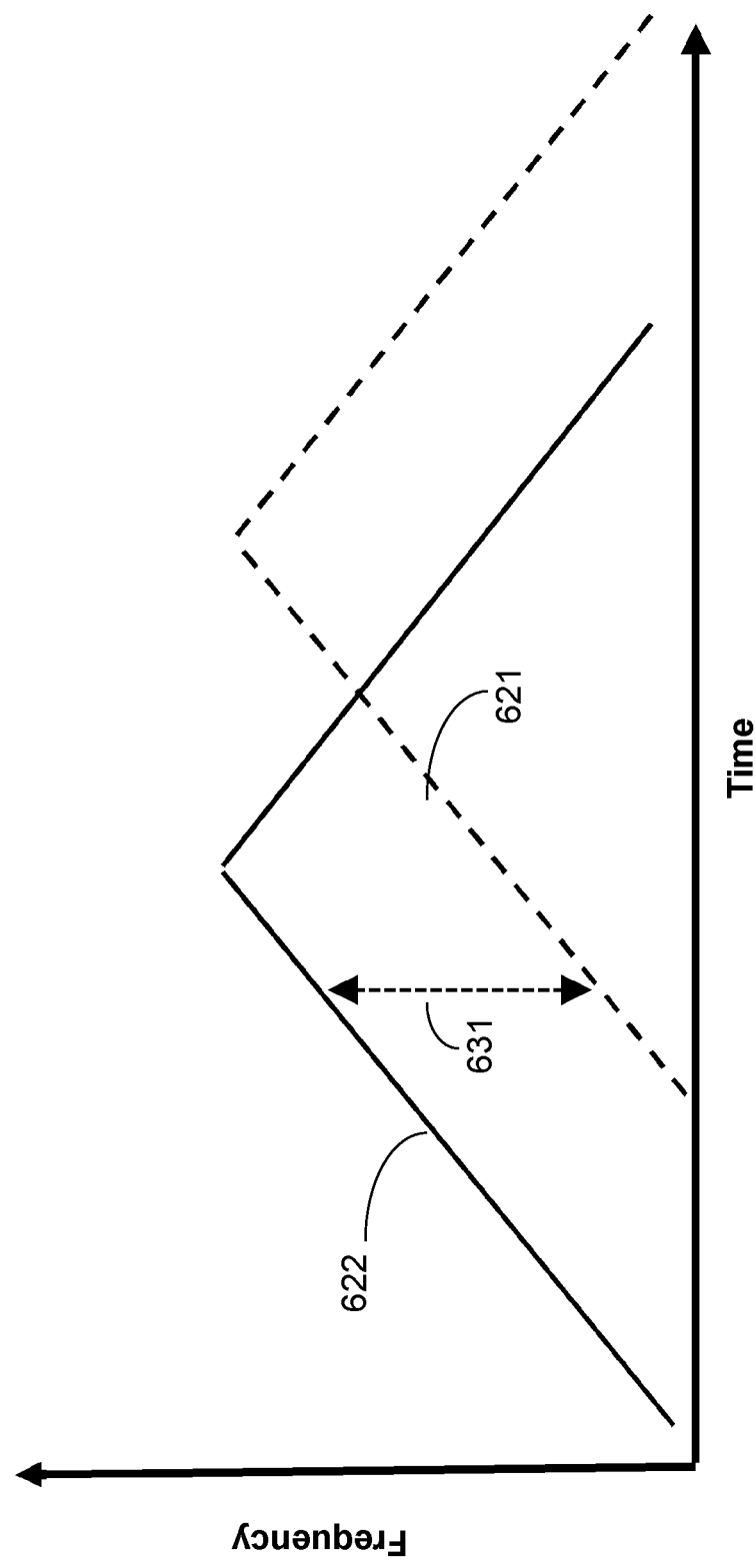

APPARATUS AND METHOD FOR ASCERTAINING A DISTANCE TO AN OBJECT

CROSS-REFERENCE TO RELATED APPLICATIONS

This application claims benefit of earlier German patent application 102019210999.3 which was filed on Jul. 24, 2019. The entire disclosure of this earlier patent application is incorporated herein by reference.

BACKGROUND OF THE INVENTION

Field of the Invention

The invention relates to an apparatus and a method for ascertaining a distance to an object. The apparatus and the method can be used to ascertain distances to both moving and stationary objects and, in particular, to ascertain the topography or form of a spatially extended three-dimensional object when used in scanning operations.

Description of the Prior Art

For the purposes of measuring the distance to objects by optical means, a measurement principle also referred to as LIDAR is known, amongst others, in which an optical signal is emitted to the relevant object and evaluated after back-reflection has taken place at the object. In practice, use is made both of time-of-flight-based measurement systems (TOF-LIDAR measurement systems, TOF=time of flight), in which the time of flight of the laser light to the respective object and back is measured directly, and FMCW-LIDAR measurement systems that use a frequency-modulated FMCW laser (FMCW=frequency-modulated continuous wave).

FIG. 6a shows, merely in a schematic illustration, a basic set-up, known per se, in which a signal 611 with a time-varying frequency (also referred to as "chirp"), emitted by a light source 610, is split into two partial signals, this split being implemented, for example, by way of a beam splitter (e.g., a partly transmissive mirror or fiber-optic splitter) which is not illustrated here. The two partial signals are coupled by way of a signal coupler 645 and superposed at a detector 650, with the first partial signal, as a reference signal 622, reaching the signal coupler 645 and the detector 650 without a reflection at the object denoted by "640". By contrast, the second partial signal incident at the signal coupler 645 or at the detector 650, as a measurement signal 621, propagates to the object 640 via an optical circulator 620 and a scanner 630, is reflected back by said object and consequently arrives at the signal coupler 645 and the detector 650 with a time delay in comparison with the reference signal 622 and a correspondingly altered frequency. An evaluation device 660 is used to evaluate the detector signal supplied by the detector 650 relative to the measuring apparatus or the light source 610, with the difference frequency 631 between the measurement signal 621 and reference signal 622, said difference frequency being captured at a certain time and illustrated in the diagram in FIG. 6b, being characteristic for the distance to the object 640 from the measuring apparatus or the light source 610.

According to FIG. 6b, the time-dependent frequency curve of the signal 611 emitted by the light source 610 can also be designed so that there are two phases in which the time derivatives of the frequency generated by the light source 610 are opposite to one another; this is to obtain additional information in respect of the relative speed between the object 640 and the measuring apparatus or the light source 610.

FIG. 7 shows an illustration for explaining the possible structure of a conventional apparatus, particularly in view of the light source unit and the evaluation device.

According to FIG. 7, a light source unit 710 generates optical signals that each have a time-varying frequency according to a specified (in particular linear) frequency curve. To this end, the light source unit 710 has a phase locked loop for closed-loop control of the optical phase (OPLL=optical phase locked loop), which, as per FIG. 7, has a splitter 712, a Mach-Zehnder interferometer 713 serving as a frequency discriminator and a detector 714, with the possibly amplified output signal of the detector 714 forming the input for a control device 715, which comprises a driver stage for the laser 711 and serves to control the laser 711. The optical signals generated by the light source unit 710 are split in a manner known per se into partial signals serving as measurement signals and partial signals serving as a reference signal by a beam splitter 712 (e.g., a partly transmissive mirror or a fiber-optic splitter). The partial signals serving as a measurement signal 721 are steered by an optical circulator 720 and a dispersive scanning device 730 onto an object (not illustrated in FIG. 7) that is to be measured in respect of its distance from the apparatus, with the partial signals serving as a reference signal 722 being used for the further evaluation in a manner analogous to FIGS. 6a-6b.

From the detector 750, the (analog) beat or difference signal is supplied via an analog-to-digital converter (ADC) 761 to a digital signal processing unit 762. The current beat or difference frequency calculated by this digital signal processing unit 762 is supplied, in synchronized fashion with the current scanning angle ascertained by a reconstruction unit 763 (i.e., the current beam direction of the measurement beams steered from the dispersive scanning device 730 onto the object), to an image reconstruction unit 764, which carries out the image reconstruction on the basis of the calculated distance and speed values, outputting a distance and velocity map of the object in the process.

A problem occurring here in practice is that the dispersive scanning device is subjected to changes in its frequency-dependent beam deflection, inter alia on account of thermal variations, with the consequence that the image reconstruction performed is incorrect—on account of a no longer correct assignment between the frequency of the respective measurement beam and the object location impinged by said measurement beam.

Possible approaches for overcoming the above-described problem include measures for thermal stabilization of the dispersive scanning device; however, this increases the complexity of the structure and increases the costs.

A further problem occurring in practice relates to ensuring an unchanging and disturbance-free frequency curve in the optical signal emitted by the light source unit, with the closed-loop control of the frequency or the change in frequency of the emitted optical signal, typically implemented using the aforementioned phase locked loop including the OPLL electronics, representing a formidable challenge.

A further factor increasing the complexity of the structure in respect of the light source unit and the closed-loop control thereof is that, under safety aspects, there needs to be monitoring—preferably redundant monitoring—of the luminous power emitted by the light source unit in order to avoid injury to persons situated in the surroundings.

With regard to the prior art, merely by way of example, reference is made to the publication N. Satyan et al: "*Precise control of broadband frequency chirps using optoelectronic feedback*", OPTICS EXPRESS Vol. 17, No. 18 (2009), 15999.

SUMMARY OF THE INVENTION

Against the aforementioned background, it is an object of the present invention to provide an apparatus and a method for ascertaining a distance to an object, which facilitates distance measurement that is as accurate and reliable as possible and which at least partly avoids the above-described disadvantages.

This object is achieved by the apparatus in accordance with the features of independent Patent Claim 1 and the method in accordance with the features of independent Patent Claim 11.

An apparatus according to the invention for ascertaining a distance to an object comprises:
- a light source unit for emitting an optical signal with a time-varying frequency;
- an evaluation device for ascertaining a distance to the object on the basis of a measurement signal that arose from the signal and was reflected at the object and on the basis of a reference signal that was not reflected at the object;
- at least one dispersive element disposed in the signal path of the optical signal; and
- at least one optical position sensor disposed downstream of this dispersive element in the signal path.

In embodiments of the invention, the dispersive element forms a scanning device for frequency-dependent deflection into different beam directions to the object of measurement beams that arose from the optical signal. Here, the apparatus can be designed, in particular, to ascertain the respective beam direction of the measurement beams on the basis of sensor signals supplied by the optical position sensor.

According to this aspect, the invention is based, in particular, on the concept of using, in combination with a dispersive element that forms a scanning device and brings about a frequency-selective deflection of the respective measurement signals to the object to be measured in terms of its distance, an optical position sensor in a LIDAR system, said optical position sensor being disposed downstream of the dispersive element in the signal path.

Here, according to the invention, the respective beam direction of the measurement beams steered to the object by the dispersive element or by the scanning device can be ascertained on the basis of sensor signals supplied by the optical position sensor. In particular, this ascertainment can be implemented independently of all parameters relating to the dispersive effect or the thermal state of the dispersive scanning device, or independently of assumptions in this respect. Consequently, according to the invention, it is also possible to avoid an incorrect image reconstruction that may be due to thermal variations and a change in the dispersion coefficient of the dispersive scanning device accompanying this. Instead, according to the invention, thermally caused changes in parameters of the dispersive scanning device are accepted (and outlay accompanying the thermal stabilization is avoided) since the image reconstruction according to the invention is implemented on the basis of the actual, current beam direction in any case and changes in the dispersion coefficient of the scanning device do not lead to an incorrect evaluation or image reconstruction.

In particular, the scanning device can also be designed for frequency-selective deflection into two mutually perpendicular directions. Here, the scanning device can be configured as a two-dimensional dispersive scanning device and can have, e.g., an AWG (array waveguide grating) in combination with a diffraction grating to this end. During the dispersive scanning process, the AWG present in the dispersive scanning device can be configured in such a way in this case that there is a comparatively fast deflection in a first spatial direction while the diffraction grating brings about a comparatively slow deflection in the spatial direction perpendicular thereto.

According to one embodiment, the apparatus comprises at least one beam splitter, which respectively couples a partial beam out of the signal path and deflects said partial beam into the direction of the optical position sensor.

In particular, the beam splitter can be disposed downstream of the dispersive element in relation to the signal path.

According to one embodiment, the apparatus comprises a closed-loop control unit for closed-loop control of the frequency or the time derivative of the frequency of the optical signal emitted by the light source unit, on the basis of sensor signals supplied by the optical position sensor.

According to this aspect, the invention contains the further principle of using the sensor signals supplied by the optical position sensor for closed-loop control of the frequency of the light source unit or of the optical signal emitted by the latter, with the consequence that it is possible to dispense with the comparatively complex phase locked loop, including the OPLL electronics, mentioned at the outset. Here, the invention makes use of the fact that the movement speed of a light spot, generated by the light source unit, on the optical position sensor ultimately also represents a measure for the "tuning speed" (i.e., the speed with which the light source unit changes the frequency of the emitted optical signal).

Here, the closed-loop control of the light source unit on the basis of sensor signals of the optical position sensor, implemented according to the aspect specified above, is also advantageous independently of the above-discussed image reconstruction (which is likewise realizable on the basis of the sensor signals of the position sensor) or the ascertainment of the beam directions of the measurement beams steered to the object. Consequently, the aforementioned closed-loop control of the light source unit on the basis of sensor signals of the optical position sensor can also be realized without this form of image reconstruction and, in particular, in conjunction with any (possibly even non-dispersive) scanning device.

According to one embodiment, the apparatus comprises a monitoring unit for monitoring the luminous power emitted by the light source unit, on the basis of sensor signals supplied by the optical position sensor.

According to this aspect, the invention makes use of the fact that the further information supplied by the optical position sensor relating to the luminous power emitted by the light source unit, which goes beyond the position information, can also be used and taken into account for such monitoring. Such monitoring of the emitted luminous power, advisable for safety aspects and for avoiding injury to persons situated in the surroundings, can also be implemented, in particular, in redundant fashion, i.e., in addition to the primary monitoring, for example on the basis of monitoring the laser current.

The above-described aspect of monitoring the luminous power, too, implemented on the basis of the optical position sensor, is advantageous independently of the above-described aspects of image reconstruction and closed-loop control of the frequency or the time derivative of the frequency of the light source unit and is realizable both in combination with the aforementioned aspects and without these.

According to one embodiment, the optical position sensor is an analog position sensor, in particular a multi-quadrant diode. In further embodiments, a position sensitive detector (PSD=position sensitive device) can also be used, for example, as an analog position sensor.

According to another embodiment, the optical position sensor is a digital image sensor, in particular a CCD sensor or a CMOS sensor.

The invention further relates to a method for ascertaining a distance to an object, the method including the following steps:

emitting an optical signal with a time-varying frequency using a light source unit; and ascertaining a distance to the object on the basis of a measurement signal that arose from the optical signal and was reflected at the object and on the basis of a reference signal that was not reflected at the object;

wherein a partial beam is coupled out of the signal path of the optical signal and supplied to an optical position sensor disposed downstream of a dispersive element in the signal path.

According to one embodiment, the dispersive element, in the method, forms a scanning device for frequency-dependent deflection into different beam directions to the object of measurement beams that arose from the optical signal.

According to one embodiment, the respective beam direction of the measurement beams is ascertained in the method on the basis of the sensor signals supplied by the optical position sensor.

According to one embodiment, the frequency or the time derivative of the frequency of the optical signal emitted by the light source unit is subject to closed-loop control in the method on the basis of the sensor signals supplied by the optical position sensor.

According to one embodiment, the luminous power emitted by the light source unit is monitored in the method on the basis of the sensor signals supplied by the optical position sensor.

Further configurations of the invention can be gathered from the description and the dependent claims.

The invention is explained in greater detail below on the basis of embodiments illustrated in the accompanying figures.

BRIEF DESCRIPTION OF THE DRAWINGS

Further features and advantages of the invention will become apparent from the following description of exemplary embodiments with reference to the drawings, in which:

FIGS. 6a-6b and 7 are schematic illustrations for explaining the structure and functionality of a conventional apparatus for ascertaining a distance.

DETAILED DESCRIPTION OF EMBODIMENTS

Below, the structure and functionality of embodiments of an apparatus according to the invention are described with reference to the schematic illustrations of FIGS. 1-5.

Figure 1:
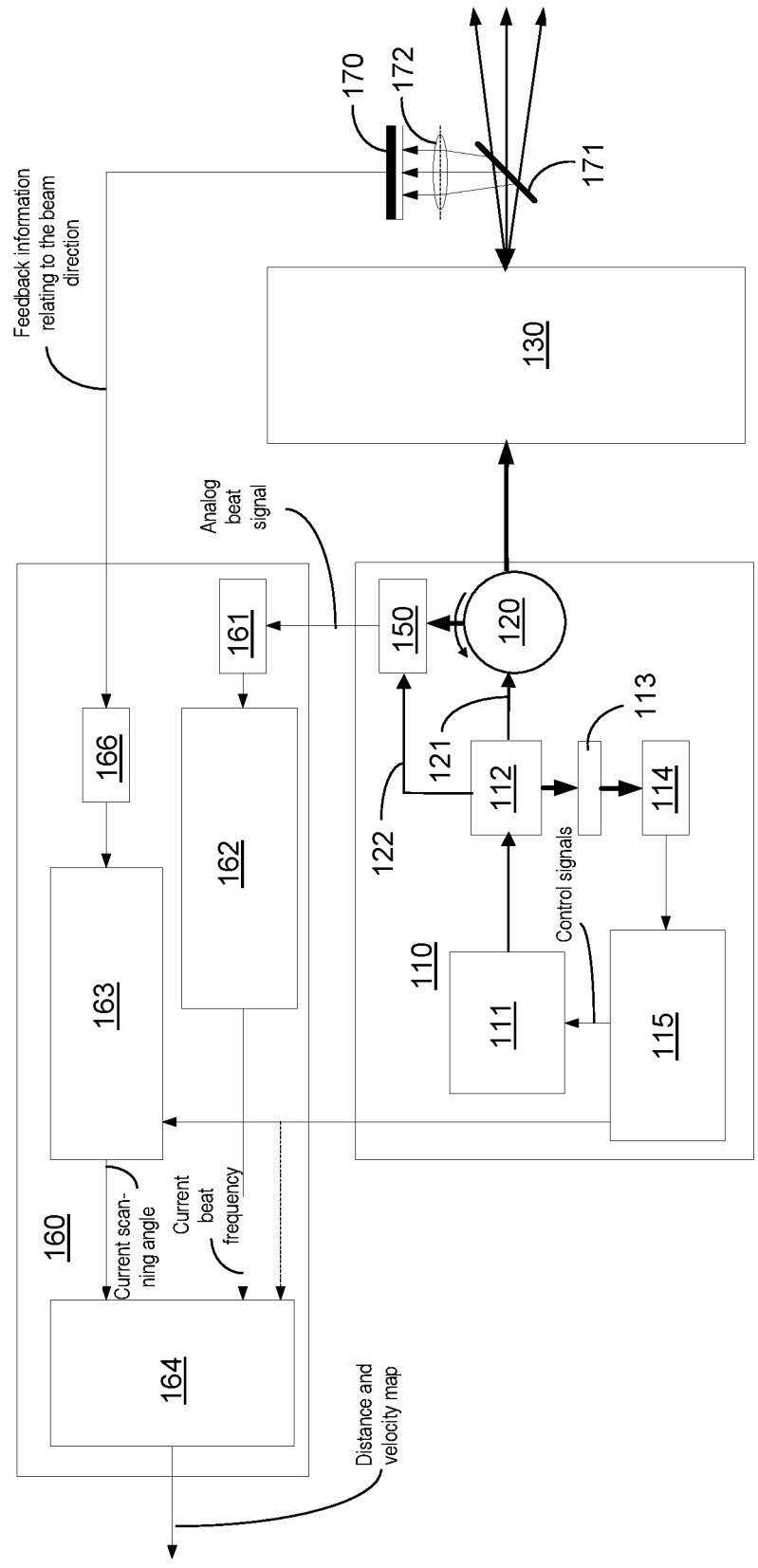
FIG. 1 are schematic illustrations for explaining the structure of an apparatus according to the invention in a first embodiment.

According to FIG. 1, the light source unit 110 comprises a frequency-modulated FMCW laser 111 (FMCW=frequency-modulated continuous wave) for emitting an optical signal with a time-varying frequency ("chirp"). By way of example, the laser 111 could be a DFB laser, a WGMR laser or else a VCSEL laser.

The light source unit 110 generates optical signals that each have a time-varying frequency according to a specified (in particular linear) frequency curve. To this end, the light source unit 110 comprises—purely in exemplary fashion and without restricting the invention thereto—a beam splitter 112, a Mach-Zehnder interferometer 113 serving as a frequency discriminator and a detector 114, with the possibly amplified output signal of the detector 114 forming the input for a control device 115, which can contain a current driver stage and serves to control the laser 111.

Figure 6A:
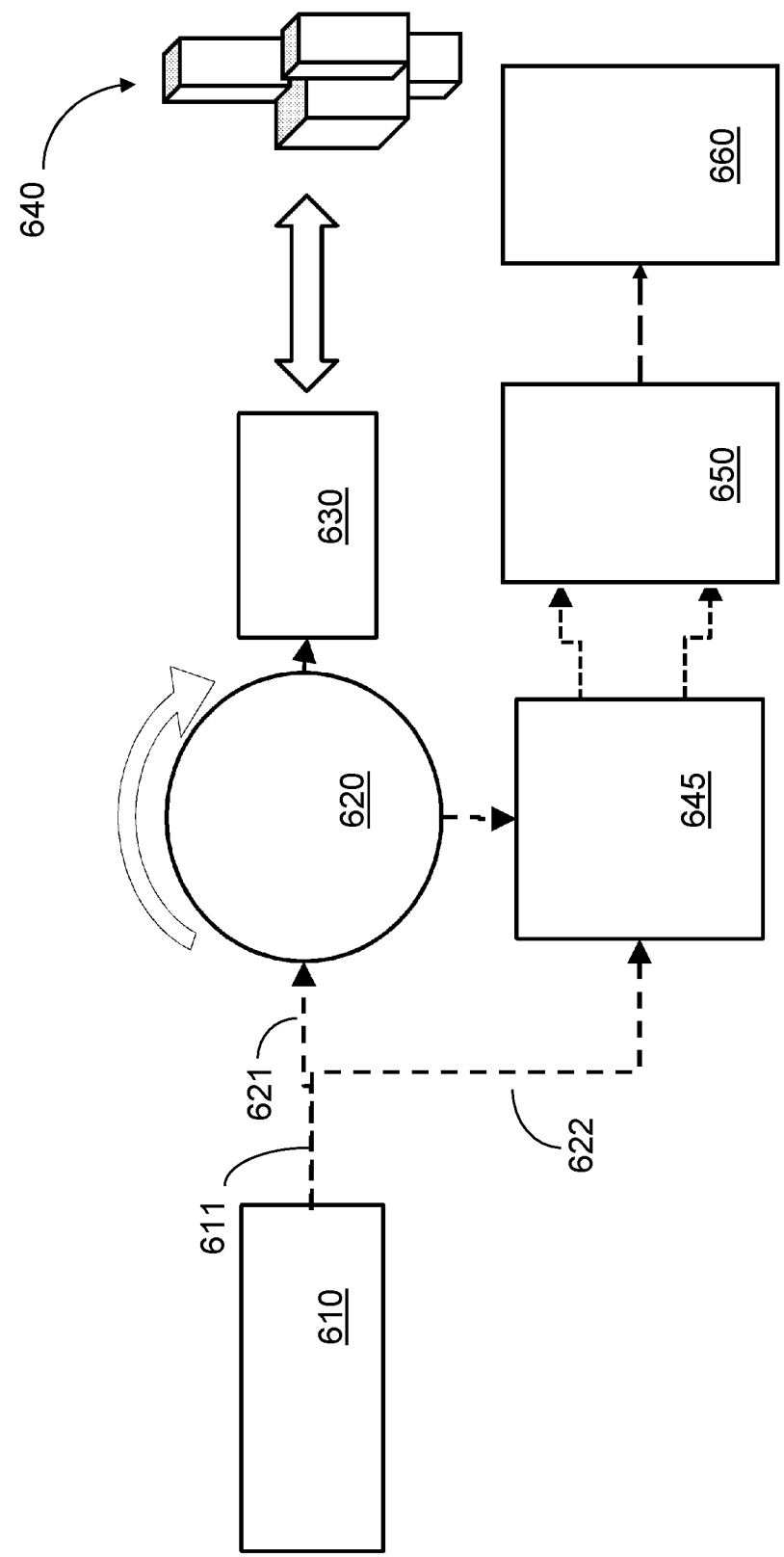
Figure 7:
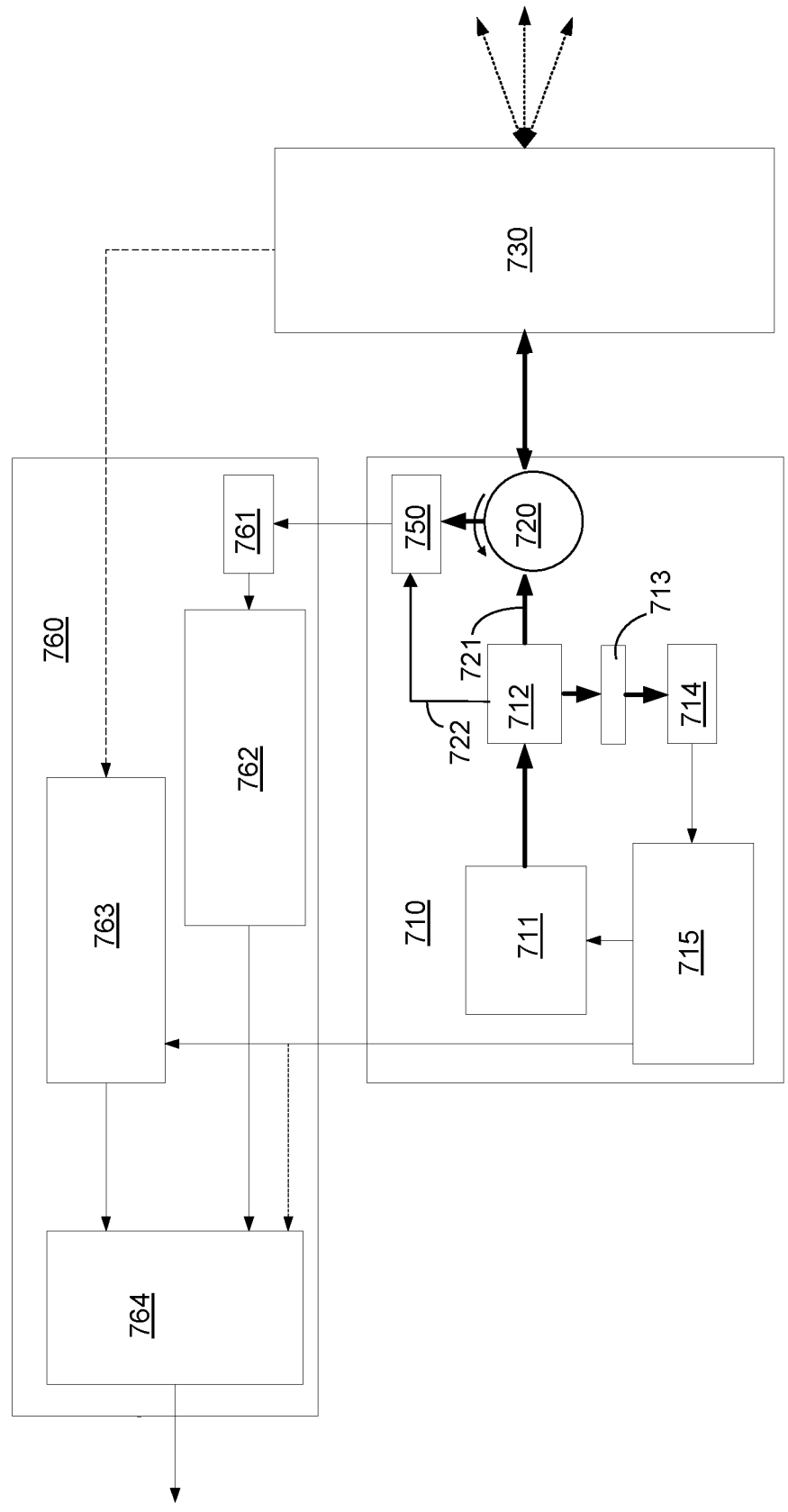

The optical signals generated by the light source unit 110 are split in a manner known per se into partial signals serving as a measurement signal 121 and partial signals serving as a reference signal 122 by the beam splitter 112 (e.g., a fiber-optic splitter). The partial signals serving as a measurement signal 121 are steered by an optical circulator 120 and a dispersive scanning device 130 onto an object (not illustrated in FIG. 1) that is to be measured in respect of its distance from the apparatus, with the partial signals serving as a reference signal 122 being used for the further evaluation in a manner analogous to FIGS. 6a-6b.

Following a reflection at the object, the signal path extends back, via the optical circulator 120, to the detector 150 and to the evaluation device 160.

What is common to the embodiments described below is that use is made in each case of an optical position sensor (denoted by "170" in FIG. 1) disposed in the signal path downstream of a dispersive element. In the embodiment of FIG. 1, the scanning device 130 comprises the dispersive element.

According to FIG. 1, the signal path downstream of the scanning device 130 contains a beam splitter 171, which couples respectively one partial beam of the measurement beams, deflected by the scanning device 130 in frequency-dependent fashion, out of the signal path and which deflects said partial beam in the direction of the optical position sensor 170. In the embodiment of FIG. 1, there is (without restricting the invention thereto, however) imaging onto the optical position sensor 170 via a Fourier optical unit 172 (e.g., in the form of one or more lenses), wherein this Fourier optical unit 172 can be disposed at a distance corresponding to its focal length from the position sensor 170 and converts the different beam angles emanating from the scanning device 130 into different locations on the position sensor 170.

As is evident from FIG. 1, the sensor signals supplied by the optical position sensor 170 are supplied to an evaluation device 160 and are supplied there, via amplifier and analog-to-digital converter represented by the function block "166", to a reconstruction unit 163 for reconstructing the respectively current beam direction. From the corresponding current beam directions and the associated difference or beat frequencies ascertained using a signal processing unit 162, the actual image reconstruction is implemented in a further reconstruction unit 164 by way of outputting a distance and velocity map relating to the object to be measured.

In order to improve the image reconstruction, synchronization signals can be transmitted from the control device 115 to the reconstruction unit 163—as indicated by an arrow in FIG. 1.

In the embodiment of FIG. 1, an analog position sensor, e.g., in the form of a four-quadrant diode, is used as an optical position sensor 170. This configuration is advantageous in that the determination of the position implemented by the optical position sensor 170 can be implemented at a comparatively high speed relative to typical values of the scanning speed and typical frame rates. Thus, for a purely exemplary frame rate of 50 Hz, 1 000 000 pixels or spot positions, for example, can be captured per frame.

Figure 2:
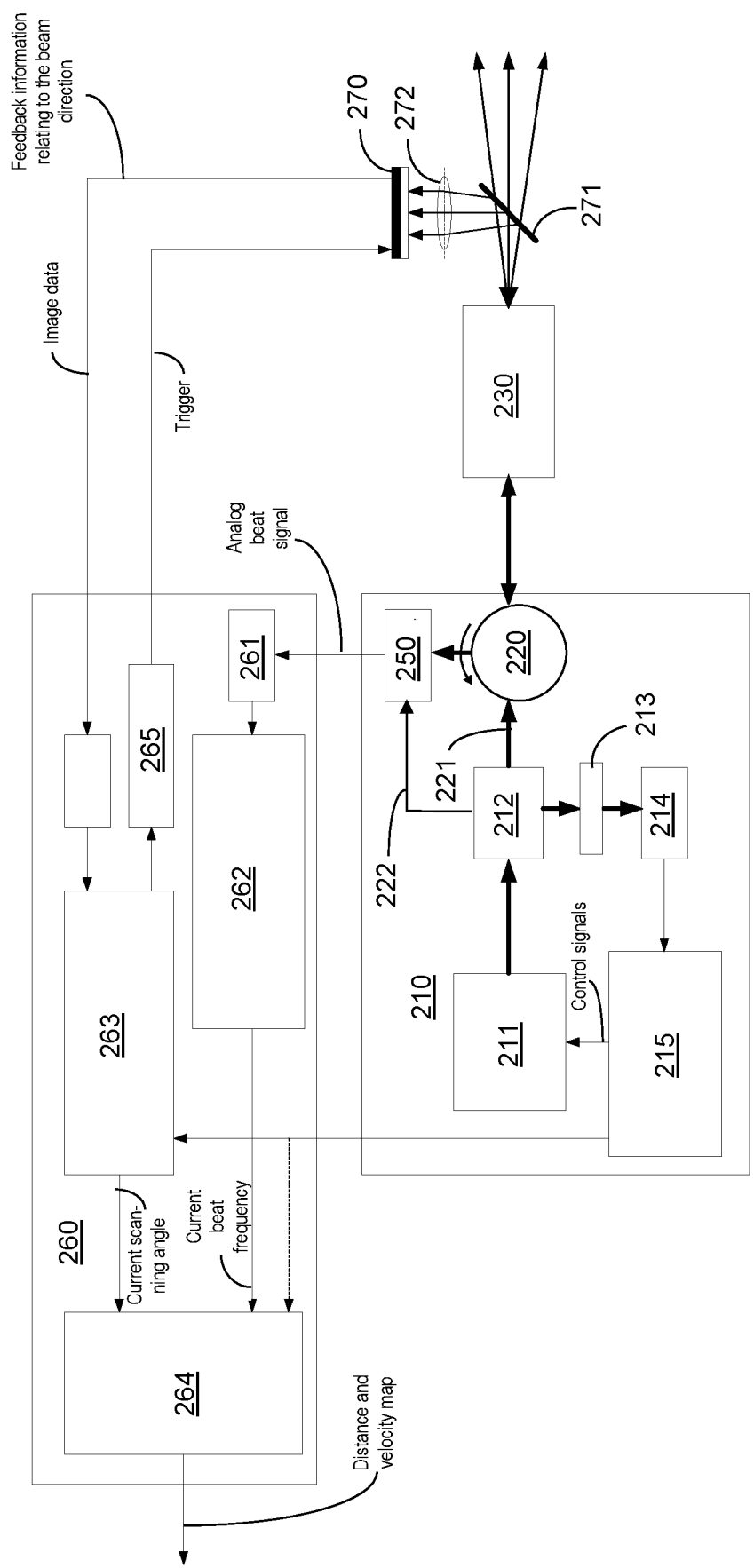
FIGS. 2-5 are diagrams for explaining further embodiments of an apparatus according to the invention.

FIG. 2 shows a further embodiment of the invention, wherein components that are analogous or substantially functionally identical in comparison with FIG. 1 are designated by reference numerals increased by "100".

A digital image sensor (in particular a CMOS sensor) is used as a position sensor 270 according to FIG. 2, in contrast with FIG. 1. In comparison with the use of an analog position sensor such as a four-quadrant diode, this configuration has the advantage of a higher signal-to-noise ratio, with a reduced speed in the determination of the position being accepted. By way of example, if the assumption is made that the digital image sensor can be read at a frequency of 1000 Hz, this means, for an exemplary frame rate of 50 Hz, a number of 1000/50=20 spot positions which can be captured per frame.

The invention can also make use of the fact that the position measurement implemented using the digital image sensor can be implemented with a reduced clock (e.g., reduced by a factor of 1000) in comparison with the pixel rate and, at the same time, with a corresponding pixel offset between successive frames, with the consequence that it still is possible to obtain the respectively desired position information for the correspondingly captured pixels.

Figure 3:
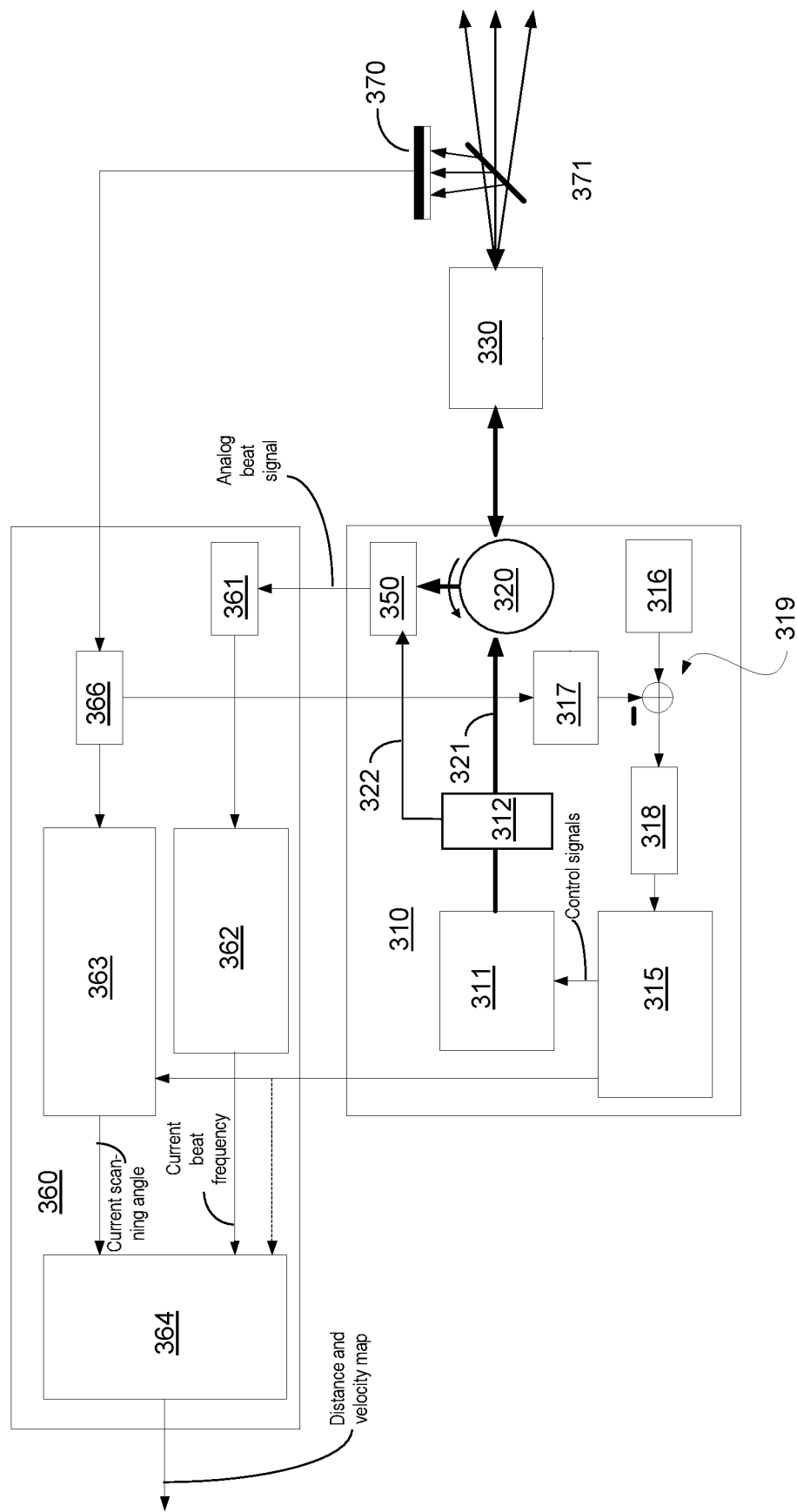

FIG. 3 shows a further embodiment, wherein components that are analogous or substantially functionally identical in comparison with FIG. 1 are designated by reference numerals increased, once again, by "100".

In particular, the embodiment of FIG. 3 differs from those of FIG. 1 and FIG. 2 in that the sensor signals of the optical position sensor 370 are additionally used for closed-loop control of the frequency of the optical signal emitted by the light source unit 310 (i.e., in particular, for "linearizing" the light source unit 310 or the chirp signal emitted thereby). Here, the corresponding closed-loop control unit 315 is no longer realized as a phase locked loop with OPLL electronics; instead, the tuning rate of the laser 311 present within the light source unit 310 can be implemented directly, with significant simplification of the control architecture, on the basis of the movement speed of the light spot generated on the position sensor 370 in each case. For instance, the dispersive element 330, present in the arrangement in any case, can be used here for closed-loop control of the frequency of the optical signal emitted by the light source unit 310 instead of the MZI and the OPLL electronics used as per FIGS. 1-2. Consequently, as per FIG. 3, this dispersive element 330 has a dual function to the extent that it is used, firstly, for the beam deflection to the object under different beam angles and, secondly, also for closed-loop control of the frequency of the light source unit 310.

In FIG. 3, "316" denotes a unit for generating the frequency ramp for the frequency tuning, "317" denotes a unit for converting the position determined on the basis of the position sensor 370 into a laser frequency, and "318" denotes a linearization regulator.

The scanning device 330 as per FIG. 3 is a two-dimensional scanning device for frequency-selective deflection of the measurement beams into two mutually orthogonal directions.

In particular, the dispersive scanning device 330 can comprise an AWG in combination with a diffraction grating for frequency-selective deflection into two mutually orthogonal directions. In respect of the structure and functionality of a two-dimensional scanning device, known per se, reference is made to K. Van Acoleyen et al.: "*Two-Dimensional Dispersive Off-Chip Beam Scanner Fabricated on Silicon-On-Insulator*", IEEE Photonics Technology Letters, Vol. 23, No. 17, Sep. 1, 2011, 1270-1272. Here, the dispersion of the AWG (which is defined by the order in which the AWG is operated) can be chosen to be substantially greater than the dispersion of the diffraction grating. As a consequence, there is a multiple scanning of the field of view (FOV=field of view) by way of the AWG along one spatial direction during the frequency tuning over the entire tuning range (of 12 THz, for example) but only a single instance of scanning the field of view along the spatial direction perpendicular thereto by way of the diffraction grating. Consequently, the AWG brings about a comparatively fast scanning process, within the meaning of a frequency-selective deflection taking place over a comparatively short timescale in a first spatial direction, whereas the diffraction grating brings about a frequency-selective beam deflection in a spatial direction perpendicular thereto over a longer timescale in a comparatively slow scanning process.

Figure 4:
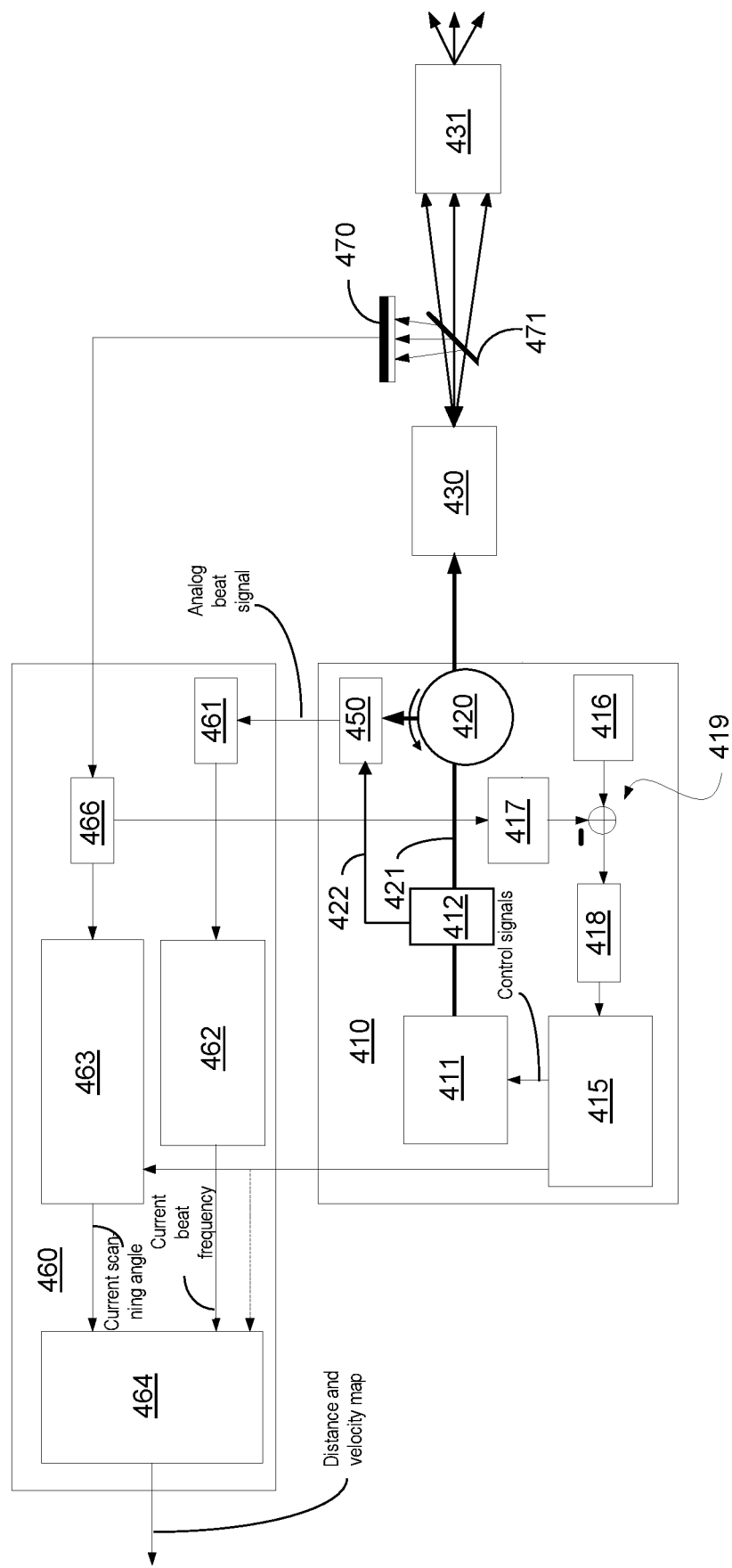

According to FIG. 4, a two-dimensional scanning device can also be constructed from two one-dimensional scanning devices 430, 431 spaced apart in the signal path (one of said scanning devices 430 possibly being configured as a diffraction grating, for example, and the other scanning device 431 possibly being embodied as mechanically moved scanning mirror). Here, the beam splitter 471 for coupling out partial beams in the direction of the optical position sensor 470 can be placed in the signal path between these one-dimensional scanning devices 430, 431, wherein the position sensor 470 itself can then be configured as a one-dimensional position sensor and can be used for closed-loop control of the frequency of the light source unit 410 and can also be used for image reconstruction, in a manner analogous to the above-described embodiments.

Figure 5:
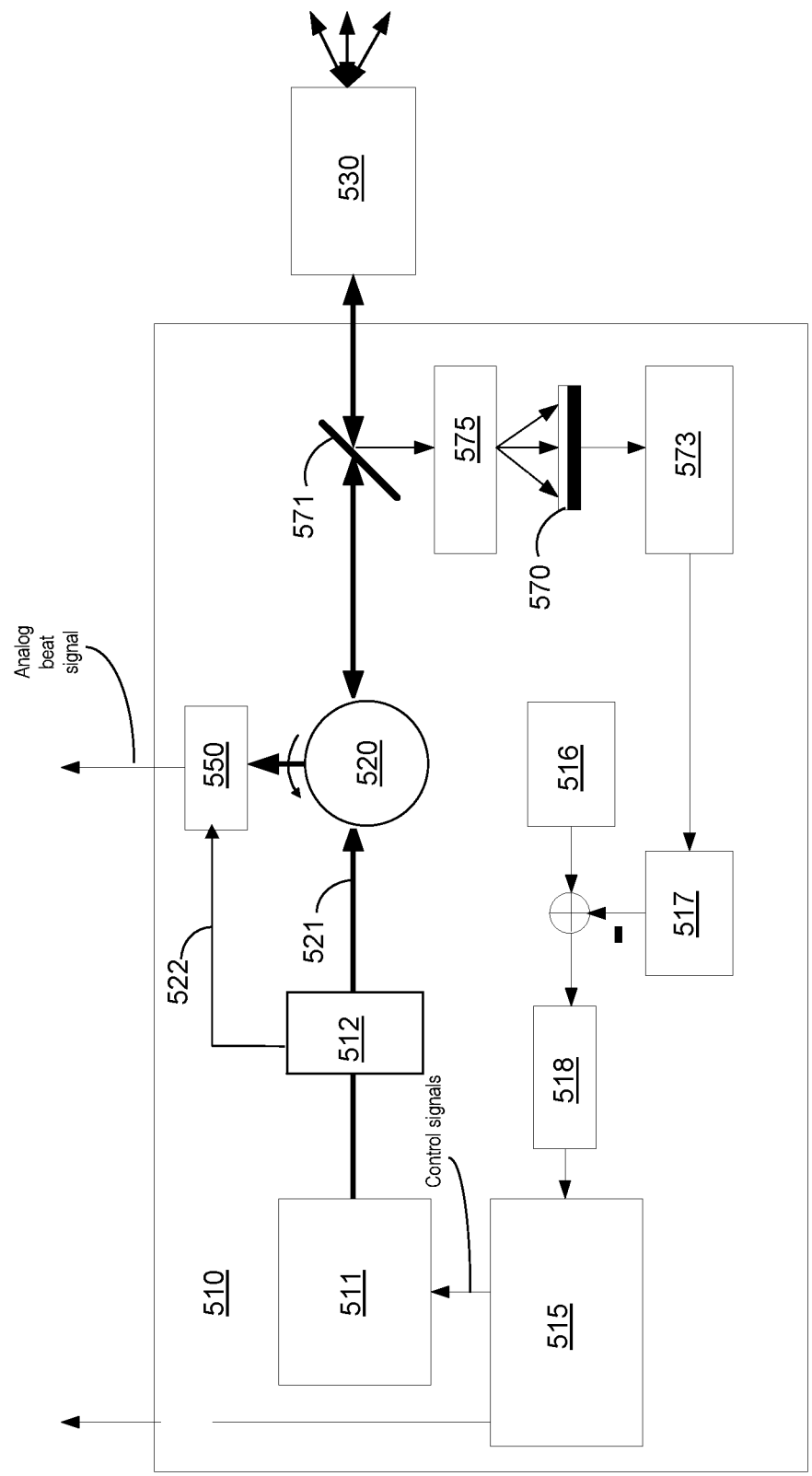

FIG. 5 shows a further embodiment of the invention, wherein components that are once again analogous or substantially functionally identical to FIG. 4 are designated by reference numerals increased by "100".

According to FIG. 5 and in contrast to the above-described embodiments, the sensor signals of the optical position sensor 570 are not used for the image reconstruction (e.g., since the dispersive behaviour of the scanning device 530 is already sufficiently stable) but only for closed-loop control of the frequency of the light source unit 510. Moreover, according to FIG. 5, the dispersive element 575 situated in the signal path upstream of the optical position sensor 570 is not used for frequency-selective deflection of the measurement beams to the object to be measured but only serves in conjunction with said optical position sensor 570 to realize the closed-loop frequency control, wherein the beam deflection of the measurement beams to the object is implemented by way of an independent scanning device 530 (which, in turn, could have a dispersive—or any other—embodiment).

Even though the invention has been described on the basis of specific embodiments, numerous variations and alternative embodiments will be apparent to the person skilled in the art, for example through combination and/or exchange of features of individual embodiments. Accordingly, it goes without saying for the person skilled in the art that such variations and alternative embodiments are concomitantly encompassed by the present invention, and the scope of the invention is restricted only within the meaning of the appended patent claims and the equivalents thereof.

The invention claimed is:

1. An apparatus for ascertaining a distance to an object, wherein the apparatus comprises:
   a light source unit configured to emit an optical signal having a time-varying frequency,
   an evaluation device configured to ascertain a distance to the object based on:
      a measurement signal that originated from the optical signal and was reflected at the object and
      a reference signal that was not reflected at the object,
   at least one dispersive element disposed in a signal path of the optical signal,
   at least one optical position sensor disposed downstream of the dispersive element such that a first portion of the signal light is directed to the object, and a second portion of the signal light is directed to the optical position sensor, wherein a first light ray directed to the optical position sensor at a first angle impinges on a first region of the optical position sensor; and a second light ray directed to the optical position sensor at a second angle different from the first angle impinges on a second region of the optical position sensor, different from the first region, and
   a monitoring unit configured to monitor a luminous power emitted by the light source unit based on sensor signals supplied by the optical position sensor.

2. The apparatus of claim 1, wherein the dispersive element forms a scanning device configured to deflect, in a frequency-dependent manner, measurement beams, which originated from the optical signal, into different beam directions towards the object.

3. The apparatus of claim 2, wherein the apparatus is configured to ascertain beam directions of the measurement beams based on sensor signals supplied by the optical position sensor.

4. The apparatus according to claim 2, wherein the scanning device is configured to deflect the measurement beams in a frequency-dependent manner into two mutually perpendicular directions.

5. The apparatus of claim 1, comprising at least one beam splitter configured to couple a partial beam out of the signal path and to deflect said partial beam towards the optical position sensor.

6. The apparatus of claim 5, wherein the beam splitter is disposed downstream of the dispersive element in the signal path.

7. The apparatus of claim 1, comprising a closed-loop control unit configured to perform, based on sensor signals supplied by the optical position sensor, a closed-loop control of a frequency of the optical signal emitted by the light source unit, or of a time derivative of said frequency.

8. The apparatus of claim 1, wherein the optical position sensor is an analog position sensor.

9. The apparatus of claim 8, wherein the analog position sensor is a multi-quadrant diode.

10. The apparatus of claim 1, wherein the optical position sensor is a digital image sensor.

11. An apparatus for ascertaining a distance to an object, wherein the apparatus comprises:
   a light source unit configured to emit an optical signal having a time-varying frequency,
   an evaluation device configured to ascertain a distance to the object based on:
      a measurement signal that originated from the optical signal and was reflected at the object and
      a reference signal that was not reflected at the object,
   at least one dispersive element disposed in a signal path of the optical signal,
   at least one optical position sensor disposed downstream of the dispersive element such that a first portion of the signal light is directed to the object, and a second portion of the signal light is directed to the optical position sensor, wherein a first light ray directed to the optical position sensor at a first angle impinges on a first region of the optical position sensor; and a second light ray directed to the optical position sensor at a second angle different from the first angle impinges on a second region of the optical position sensor, different from the first region, and
   a closed-loop control unit configured to perform, based on sensor signals supplied by the optical position sensor, a closed-loop control of a frequency of the optical signal emitted by the light source unit, or of a time derivative of said frequency.

12. The apparatus of claim 11, wherein the dispersive element forms a scanning device configured to deflect, in a frequency-dependent manner, measurement beams, which originated from the optical signal, into different beam directions towards the object.

13. The apparatus of claim 12, wherein the apparatus is configured to ascertain beam directions of the measurement beams based on sensor signals supplied by the optical position sensor.

14. The apparatus according to claim 12, wherein the scanning device is configured to deflect the measurement beams in a frequency-dependent manner into two mutually perpendicular directions.

15. The apparatus of claim 11, comprising at least one beam splitter configured to couple a partial beam out of the signal path and to deflect said partial beam towards the optical position sensor.

16. The apparatus of claim 15, wherein the beam splitter is disposed downstream of the dispersive element in the signal path.

17. The apparatus of claim 11, wherein the optical position sensor is an analog position sensor.

18. The apparatus of claim 17, wherein the analog position sensor is a multi-quadrant diode.

19. The apparatus of claim 11, wherein the optical position sensor is a digital image sensor.

20. A method for ascertaining a distance to an object, the method comprising:
   emitting an optical signal having a time-varying frequency from a light source unit;
   ascertaining a distance to the object based on:
      a measurement signal that originated from the optical signal and was reflected at the object and
      a reference signal that was not reflected at the object;
   coupling a partial beam out of a signal path of the optical signal and directing said partial beam towards an optical position sensor disposed downstream of a dispersive element such that a first portion of the optical signal is directed to the object, and a second portion of the optical signal is directed to the optical position sensor, wherein a first light ray directed to the optical position sensor at a first angle impinges on a first region of the optical position sensor; and a second light ray directed to the optical position sensor at a second angle different from the first angle impinges on a second region of the optical position sensor, different from the first region; and monitoring a luminous power emitted by the light source unit based on sensor signals supplied by the optical position sensor.

21. The method of claim 20, wherein the dispersive element deflects, in a frequency-dependent manner, measurement beams, which originated from the optical signal, into different beam directions towards the object, and wherein beam directions of the measurement beams are ascertained based on the sensor signals supplied by the optical position sensor.

22. The method of claim 20, wherein a closed-loop control unit performs, based on sensor signals supplied by the optical position sensor, a closed-loop control of a frequency of the optical signal emitted by the light source unit, or of a time derivative of said frequency.

23. The method of claim 20, wherein a luminous power emitted by the light source unit is monitored based on the sensor signals supplied by the optical position sensor.

* * * * *